(12) United States Patent
D'Agostini et al.

(10) Patent No.: US 6,910,432 B2
(45) Date of Patent: Jun. 28, 2005

(54) SELECTIVE OXYGEN ENRICHMENT IN SLAGGING CYCLONE COMBUSTORS

(75) Inventors: Mark Daniel D'Agostini, Hazleton, PA (US); William Russell Welliver, Ship Bottom, NJ (US); Craig J. Cain-Borgman, Emmaus, PA (US); Kevin Boyle Fogash, Wescosville, PA (US); Kevin M. Duffy, Alburtis, PA (US); Francis Anthony Milcetich, Coopersburg, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 10/645,101

(22) Filed: Aug. 21, 2003

(65) Prior Publication Data

US 2005/0039654 A1 Feb. 24, 2005

(51) Int. Cl.[7] .............. F23D 1/02; F23J 15/00
(52) U.S. Cl. .......... 110/348; 110/345; 110/264
(58) Field of Search ............... 431/284, 285, 431/187, 8, 10; 122/235.28, 235.12; 110/264, 348, 347, 345

(56) References Cited

U.S. PATENT DOCUMENTS

| 2,745,732 A | 5/1956 | Oster .................... 75/26 |
| 2,979,000 A * | 4/1961 | Sifrin et al. ........... 110/265 |
| 4,343,606 A | 8/1982 | Blair et al. ............ 431/10 |
| 4,427,362 A | 1/1984 | Dykema ................ 431/4 |
| 4,598,652 A | 7/1986 | Hepworth ............. 110/345 |
| 4,747,355 A * | 5/1988 | van Berkum .......... 110/229 |
| 5,022,329 A | 6/1991 | Rackley et al. ........ 110/234 |
| 5,052,312 A | 10/1991 | Rackley et al. ........ 110/346 |
| 5,690,039 A * | 11/1997 | Monro et al. .......... 110/264 |
| 5,878,700 A | 3/1999 | Farzan et al. .......... 122/4 D |
| 5,988,081 A * | 11/1999 | Ashworth et al. ...... 110/345 |
| 6,085,674 A | 7/2000 | Ashworth .............. 110/347 |
| 6,152,054 A * | 11/2000 | Ashworth et al. ...... 110/345 |
| 6,325,002 B1 | 12/2001 | Ashworth .............. 110/345 |
| 6,394,790 B1 | 5/2002 | Kobayashi ............. 431/10 |
| 2002/0184817 A1 | 12/2002 | Johnson et al. ........ 44/620 |
| 2003/0009932 A1 | 1/2003 | Kobayashi et al. ..... 44/620 |

FOREIGN PATENT DOCUMENTS

EP       1094273 A1 *  4/2001   .......... F23D/14/32

* cited by examiner

Primary Examiner—Kenneth Rinehart
(74) Attorney, Agent, or Firm—Keith D. Gourley

(57) ABSTRACT

A method for combusting a fuel in a cyclone combustor having a burner and a barrel includes: feeding a stream of the fuel into the barrel at the burner end of the barrel; feeding a stream(s) of a first oxidant (e.g., air) having a first oxygen concentration into the barrel at a first flowrate, the stream(s) of the first oxidant including a predominant stream; feeding a stream(s) of a second oxidant (e.g., oxygen) having a second oxygen concentration into the barrel at a second flowrate and in a selective manner, whereby a portion of the first oxidant combines with a portion of the second oxidant, thereby forming a combined oxidant having a combined oxygen concentration, and a portion of the first oxidant from the predominant stream continues having the first oxygen concentration; and combusting a portion of the fuel with a portion of the combined oxidant in the barrel.

36 Claims, 8 Drawing Sheets

SELECTIVE OXYGEN ENRICHMENT IN SLAGGING CYCLONE COMBUSTORS

BACKGROUND OF THE INVENTION

The present invention relates generally to the field of fossil fuel cyclone-fired boilers, and in particular to the selective use of oxygen enrichment at strategic points in the barrel of a slagging cyclone combustor to maintain desired slag flow characteristics, thereby broadening the range of amenable fuels and operating conditions while lowering operating costs, improving combustion efficiency, and reducing nitrogen oxide emissions.

Cyclone-fired boilers were developed in the 1940s primarily to improve the firing of coals with low ash-fusion temperature through minimizing the ash-induced slagging/fouling of high temperature heat transfer surfaces within the boiler. This was accomplished by combusting the coal and simultaneously melting the ash in a high-temperature chamber adjacent to the boiler, discharging the essentially ash-free products of combustion into the boiler and draining the molten slag to a tank at the bottom of the furnace. While this indeed reduced boiler-side fouling, the need to maintain a continuously-draining molten ash placed restrictions on the coal supply that generally increase the cost of powering the unit. Moreover, localized slag solidification within the cyclone is known to reduce unit availability while also hampering the ability to lower the firing rate and alter the stoichiometric ratio of the combustion process. (The stoichiometric ratio represents the relative proportion of oxidant to fuel used in the combustion process. A stoichiometric ratio of 1.0 is the theoretical minimum needed for complete combustion of the fuel, while a stoichiometric ratio less than 1.0 signifies fuel-rich combustion.) Finally, because of the high-temperatures needed to melt the slag, and the tendency to run at or above stoichiometric conditions, cyclone combustors are known to generate relatively high levels of nitrogen oxide (NOx) emissions, typically in the range of 1.0–2.0 lb $NO_2$/MMBtu prior to post-combustion treatment. Hence, the limitations on NOx imposed by the 1990 Clean Air Act Amendments are particularly challenging and costly to achieve within fossil fuel cyclone-fired boilers.

A typical cyclone combustor 10 is illustrated in FIG. 1. Conventional combustion within a slagging cyclone combustor of this design is carried out by injecting crushed coal and primary air through a coal pipe 12 to a burner 14. Tertiary air enters the burner at the tertiary air inlet 16, and secondary air (the main combustion air) enters the cyclone combustor at the secondary air inlet 18. The burner, which imparts a swirl motion to the crushed coal in the same rotation as the secondary air, injects a coal/air mixture with high tangential velocity into a refractory lined combustion chamber or barrel 20. The coal is crushed (~95% through 4 mesh [4.8 mm] screen) rather than pulverized (~70–80% through 200 mesh [70 micron] screen) to minimize the escape of fines from the barrel. Coal particles are thrown outward as the flow spins through the barrel, creating a region of high heat release adjacent the refractory lining of the barrel wall. The high temperature in this region causes the ash contained within the coal to melt. The molten "slag" 22 acts as a trap for the carbon-rich coal particles, retaining the particles for a period of time far greater than the average gas residence time within the barrel, thereby enabling a high degree of carbon burnout. The molten slag eventually migrates forward along the wall of the barrel, exits at the slag spout opening 24, and continuously drains through a slag tap opening 26 located below the re-entrant throat 28. The gas flow makes a triple pass—initially swirling along the barrel wall toward the re-entrant throat, then swirling upstream within an annular region, and finally turning and exiting from the barrel through the re-entrant throat into the furnace 30.

Oxygen enrichment has not been used in cyclone combustors to refuel cyclone-fired boilers with coals that are not amenable to air-fuel slagging operation. However, the use of oxygen enrichment to maintain molten slag and accelerate combustion within cyclone combustors has been considered. For example, U.S. Pat. No. 2,745,732 (Oster) discloses the use of oxygen enrichment in a cyclone combustor to sustain a molten slag layer under reducing conditions in order to maximize recovery of metallic iron from the ash. The oxygen used for this purpose is introduced via a high-velocity, pre-heated, oxygen-enriched secondary air stream injected tangentially into the cyclone.

U.S. Pat. No. 4,598,652 (Hepworth) discusses the possibility of using oxygen enrichment in a coal-fired cyclone combustor in which iron oxide particles are injected for sulfur capture. Although oxygen enrichment is mentioned as a possible means of accelerating the rates of reaction, there is no discussion regarding how or where the oxygen would be introduced into the cyclone combustor.

Techniques for controlling ash viscosity in cyclones without the use of oxygen enrichment also have been considered. U.S. Pat. No. 5,022,329 (Rackley, et al.) and U.S. Pat. No. 5,052,312 (Rackley et al.) teach the addition of fluxing agents to maintain the T250 of the ash below 2500° F. to limit the vaporization of heavy metals. (The T250 value denotes the temperature at which a coal slag has a viscosity of 250 centipoise.)

U.S. Pat. No. 6,085,674 (Ashworth) discusses the addition of lime or limestone into a cyclone to lower ash viscosity. U.S. Patent Application No. 2002/0184817 (Johnson, et al.) describes the use of an iron-based additive to modify the viscosity and slagging characteristics of coals, particularly low-sulfur Western U.S. coals.

With regard to NOx reduction in cyclone combustors, U.S. Pat. No. 5,878,700 (Farzan, et al.) proposes injection of a secondary fuel (reburn fuel) along the axis of the barrel to convert NOx formed within the barrel to $N_2$ as gases are discharged from the unit. U.S. Pat. No. 6,085,674 (Ashworth) proposes NOx reduction through a combination of steam injection and a three-stage combustion process comprised of a fuel-rich barrel operation followed by two distinct stages of air addition. U.S. Pat. No. 6,325,002 (Ashworth) further proposes injection of tertiary and overfire air in such a way as to create in-situ recirculation of flue gases to dilute the products of combustion and further lower NOx. None of these references discloses or teaches the use of oxygen enrichment as a means to reduce NOx.

Several references contemplate NOx reduction with the aid of oxygen enrichment, but without specific reference to cyclone combustors. U.S. Pat. No. 4,427,362 (Dykema) describes a combustion method requiring a high-temperature, fuel-rich first stage for the purpose of reducing NOx emissions. The high temperature (at least 1800K) is required to accelerate reaction kinetics, while fuel-rich conditions (stoichiometric ratio between 0.45–0.75) are needed to establish equilibrium chemistry with minimal NOx formation. Although this patent mentions the possibility of using oxygen enrichment, it does not provide any information on how oxygen would be introduced into the system. Moreover, this patent does not teach the use of oxygen enrichment in cyclone combustors.

A similar approach to NOx reduction is discussed in U.S. Pat. No. 4,343,606 (Blair, et al.) except that this reference includes one or more secondary air injection points to complete combustion, while also omitting particulate injection. This patent teaches a first stage equivalence ratio of greater than about 1.4 (stoichiometric ratio less than about 0.7), while allowing for enrichment of air with between 6 and 15 weight percent oxygen. However, no details are provided regarding the means of introduction of the oxygen, nor is there any discussion regarding operational issues specific to cyclone combustors.

U.S. Pat. No. 6,394,790 (Kobayashi) discloses a method for NOx reduction via deeply staged (i.e., exceedingly fuel-rich) oxygen-enriched primary combustion coupled with secondary oxidant injection. The oxygen concentration of the primary oxidizer is at least 30%, while the required oxidizer to fuel ratio in the primary stage is between 5% and 50% of stoichiometric. This patent teaches that high velocity injection of reactants is key to NOx reduction since the vigorous mixing it induces will serve to lower the reaction temperature. The only solid fuel explicitly mentioned in this patent is pulverized coal, suggesting that application to slagging cyclone combustors was not intended.

U.S. Patent Application No. 2003/0009932 (Kobayashi, et al.) also addresses NOx reduction in coal-fired boilers via a fuel-rich first combustion stage with oxygen enrichment up to 8 volume percent. No fixed limits are placed on the first stage stoichiometric ratio, and no mention is made of ash fusibility or viscosity. Several references are made to pulverized coal (in contrast to crushed coal) and low NOx burners, suggesting that application of the method to cyclone combustors was not intended. This patent application suggests that there is a certain stoichiometric ratio (not precisely quantified) below which NOx emissions will be reduced with oxygen-enriched combustion relative to air-fuel combustion. However, the application does not contemplate the influence of aerodynamics, mixing or particle time-temperature history on NOx characteristics.

A fundamental requirement for stable operation of a slagging cyclone combustor is that the ash layer remains in a molten state with sufficiently low viscosity to permit adequate drainage of the slag. Difficulties in achieving this condition contribute to reduced on-stream time and restricted load-following capability in conveniently-operated air-fuel slagging cyclone combustors. Experience has determined that the critical viscosity for adequate drainage is 250 centipoise. As previously noted, the temperature corresponding to this viscosity level is T250. Stable operation of a slagging cyclone combustor requires the temperature of the slag to be greater than or equal to T250. This requirement places limits on the allowable range of coals and operating conditions, while also contributing to higher NOx emissions than encountered in many pulverized coal combustion systems.

It is desired to have a method and a system to permit refueling of cyclone combustors with coals that are not amenable to air/fuel-fired cyclone operation due to the inability to maintain a molten slag layer of sufficiently low viscosity to permit continuous slag flow.

It is still further desired to have a method and a system to minimize the escape of fine coal particles from the barrel of a cyclone.

It is still further desired to have a method and a system to lower NOx emissions in slagging cyclone combustors, primarily (but not exclusively) by broadening the ranges of stoichiometric ratio and firing rate, relative to air-fuel operation, under which a molten slag layer can be maintained.

It is still further desired to have a method and a system to improve unit availability (i.e., on-stream time) by minimizing temperature excursions that result in freezing of the slag.

It also is desired to have a method and a system for combusting a fuel in a cyclone combustor which afford better performance than the prior art, and which also overcome many of the difficulties and disadvantages of the prior art to provide better and more advantageous results.

BRIEF SUMMARY OF THE INVENTION

The present invention is a method and a system for combusting a fuel in a cyclone combustor. The invention also includes a method and a system for extending a range of amenable fuel types and operating parameters of a slagging cyclone combustor. In addition, the invention includes a method and a system for reducing nitrogen oxide emissions from a flue gas generated during combustion of a fuel in a cyclone combustor. Finally, the invention includes a method and a system for operating a steam-generating boiler or furnace in communication with a cyclone combustor.

There are multiple steps in a first embodiment of the method for combusting a fuel in a cyclone combustor having a burner in communication with a barrel having a longitudinal axis, a burner end adjacent the burner, and a throat end opposite the burner end. The first step is to feed a stream of the fuel into the barrel of the cyclone combustor at the burner end of the cyclone combustor. The second step is to feed at least one stream of a first oxidant having a first oxygen concentration of about 21 vol. % into the barrel of the cyclone combustor at a first flowrate, the at least one stream of the first oxidant comprising at least one predominant stream of the first oxidant. The third step is to feed at least one stream of a second oxidant having a second oxygen concentration greater than the first oxygen concentration into the barrel of the cyclone combustor at a second flowrate and in a selective manner, whereby a portion of the first oxidant in the barrel of the cyclone combustor combines with at least a portion of the second oxidant in the barrel of the cyclone combustor, thereby forming a combined oxidant having a combined oxygen concentration greater than the first oxygen concentration and less than the second oxygen concentration, and at least a portion of the first oxidant from the at least one predominant stream of the first oxidant in the barrel of the cyclone combustor continues having the first oxygen concentration. The fourth step is to combust at least a portion of the fuel in the barrel of the cyclone combustor with at least a portion of the combined oxidant in the barrel of the cyclone combustor.

With regard to the term "selective manner" in which the at least one stream of a second oxidant is fed into the barrel, various examples of selective feed or injection techniques are shown in FIGS. 3A–3F, 4A–4B, 5A–5D, and 6A–6C, and are also discussed in the Detailed Description of the Invention. Persons skilled in the art will recognize, however, that there may be other techniques for feeding or injecting the at least one stream of the second oxidant into the barrel of the cyclone combustor in a "selective manner," including but not limited to variations and modifications of the specific selective techniques illustrated and discussed herein.

There are many variations of the first embodiment of the method for combusting a fuel in a cyclone combustor. In one variation, the fuel is coal. In another variation, the at least one stream of the first oxidant further comprises a primary oxidant stream having an oxygen concentration of about 21 vol. %, and at least a portion of the at least one stream of the second oxidant fed into the barrel of the cyclone combustor is combined with at least a portion of the primary oxidant stream. In yet another variation, the combined oxygen concentration is less than about 31 vol. %.

In another variation of the first embodiment, at least a portion of the at least one stream of the second oxidant fed into the barrel of the cyclone combustor flows substantially along the longitudinal axis of the barrel of the cyclone combustor. In a variant of that variation, the at least a portion of the at least one stream of the second oxidant flowing substantially along the longitudinal axis of the barrel of the cyclone combustor has a swirling motion.

In another variation of the first embodiment, at least a portion of the at least one stream of the second oxidant is fed into the barrel of the cyclone combustor at a location adjacent the burner end of the cyclone combustor. In yet another variation, at least a portion of the at least one stream of the second oxidant is fed into the barrel of the cyclone combustor at an intermediate location between the burner end and the throat end of the cyclone combustor. In still yet another variation, at least a portion of the at least one stream of the second oxidant is fed into the barrel of the cyclone combustor at another location adjacent the throat end of the cyclone combustor.

A second embodiment of the method for combusting a fuel in a cyclone combustor is a variation of the first embodiment and includes an additional step. In the second embodiment, the at least one stream of the first oxidant further comprises a primary oxidant stream having an oxygen concentration of about 21 vol. %. The additional step is to mix at least a portion of the stream of the fuel with at least a portion of the primary oxidant stream to form a mixed stream, wherein at least a portion of the at least one stream of the second oxidant is fed into the barrel of the cyclone combustor at a location adjacent the mixed stream.

Another embodiment is a method for combusting a slagging coal with at least a first oxidant having a first oxygen concentration of about 21 vol. % and a second oxidant having a second oxygen concentration greater than the first oxygen concentration in a slagging cyclone combustor in communication with a furnace while minimizing an amount of nitrogen oxide emissions in a flue gas generated during combustion of the slagging coal, the slagging coal not being amendable to use in the slagging cyclone combustor operated with a flow of air as an only oxidant, the slagging cyclone combustor having a burner in communication with a barrel having a longitudinal axis, a burner end adjacent the burner and a throat end opposite the burner end. This third embodiment includes multiple steps. The first step is to feed a stream of the slagging coal into the barrel of the slagging cyclone combustor at the burner end of the slagging cyclone combustor. The second step is to feed at least one stream of the first oxidant into the barrel of the slagging cyclone combustor at a first flowrate, the at least one stream of the first oxidant including at least one predominant stream of the first oxidant. The third step is to feed at least one stream of the second oxidant into the barrel of the slagging cyclone combustor at a second flowrate and in a selective manner, whereby a portion of the first oxidant in the barrel of the first slagging cyclone combustor combines with at least a portion of the second oxidant in the barrel of the slagging cyclone combustor, thereby forming a combined oxidant having a combined oxygen concentration greater than the first oxygen concentration and less than the second oxygen concentration, and at least a portion of the first oxidant from the at least one predominant stream of the first oxidant in the barrel of the slagging cyclone combustor continues having a first oxygen concentration. The fourth step is to combust at least a portion of the slagging coal in the barrel of the slagging cyclone combustor with at least a portion of the first oxidant and at least a portion of the combined oxidant in the barrel of the slagging cyclone combustor, thereby generating the flue gas and a stable and continuous flow of a molten slag in the barrel of the slagging cyclone combustor. The fifth step is to drain at least a portion of the stable and continuous flow of the molten slag from the barrel of the slagging cyclone combustor. The sixth step is to transfer at least a portion of the flue gas from the barrel of the slagging cyclone combustor to the furnace.

There are several embodiments of the method for extending a range of amenable fuel types and operating parameters of a slagging cyclone combustor having a burner in communication with a barrel having a longitudinal axis, a burner end adjacent the burner, and a throat end opposite the burner end. The first embodiment of this method includes multiple steps. The first step is to feed a stream of the fuel into the barrel of the slagging cyclone combustor at the burner end of the slagging cyclone combustor. The second is to feed at least one stream of the first oxidant having a first oxygen concentration of about 21 vol. % into the barrel of the slagging cyclone combustor at a first flowrate, the at least one stream of the first oxidant including at least one predominant stream of the first oxidant. The third step is to feed at least one stream of the second oxidant having a second oxygen concentration greater than the first oxygen concentration into the barrel of the slagging cyclone combustor at a second flowrate and in a selective manner, whereby a portion of the first oxidant in the barrel of the slagging cyclone combustor combines with at least a portion of the second oxidant in the barrel of the slagging cyclone combustor, thereby forming a combined oxidant having a combined oxygen concentration greater than the first oxygen concentration and less than the second oxygen concentration, and at least a portion of the first oxidant from the at least one predominant stream of the first oxidant in the barrel of the slagging cyclone combustor continues having the first oxygen concentration. The fourth step is to combust at least a portion of the fuel in the barrel of the slagging cyclone combustor with at least a portion of the combined oxidant in the barrel of the slagging cyclone combustor, thereby generating a plurality of products of combustion and a stable and continuous flow of a molten slag in the barrel of the slagging cyclone combustor.

A second embodiment of this method includes the additional step of draining at least a portion of the stable and continuous flow of the molten slag from the barrel of the slagging cyclone combustor. In a variation of the first and second embodiments of this method, the fuel is coal.

There also are several embodiments of the method for reducing nitrogen oxide emissions from a flue gas generated during combustion of a fuel in a cyclone combustor having a burner in communication with a barrel having a longitudinal axis, a burner end adjacent the burner, and a throat end opposite the burner end. The first embodiment of this method includes multiple steps. The first step is to feed a stream of the fuel into the barrel of the cyclone combustor of the burner end of the cyclone combustor. The second step is to feed at least one stream of a first oxidant having a first oxygen concentration of about 21 vol. % into the barrel of the cyclone combustor at a first flowrate, the at least one stream of the first oxidant including at least one predominant stream of the first oxidant. The third step is to feed at least one stream of a second oxidant having a second oxygen concentration greater than the first oxygen concentration into the barrel of the cyclone combustor at a second flowrate and in a selective manner, whereby a portion of the first oxidant in the barrel of the cyclone combustor combines with at least a portion of the second oxidant in the barrel of the cyclone combustor, thereby forming a combined oxidant having a combined oxygen concentration greater than the first oxygen concentration and less than the second oxygen concentration, and at least a portion of the first oxidant from the at least one predominant stream of the first oxidant in the barrel of the cyclone combustor continues having the first oxygen concentration. The fourth step is to combust at least a portion of the fuel in the barrel of the cyclone combustor with at least a portion of the combined oxidant in the barrel of the cyclone combustor, thereby generating the flue gas containing a reduced amount of nitrogen oxide in the barrel of the cyclone combustor, the reduced amount of nitrogen oxide being less than a higher amount of nitrogen oxide that would be generated by the cyclone combustor operated with a flow of air as an only oxidant.

A second embodiment of this method is similar to the first embodiment, with one variation, but includes three additional steps. The variation is that the throat end of the barrel of the cyclone combustor is in fluid communication with a furnace. The first additional step is to transfer at least a portion of the flue gas from the barrel of the cyclone combustor to the furnace. The second additional step is to feed a stream of a secondary fuel into the furnace. The third additional step is to combust at least a portion of the secondary fuel in the furnace.

In a variation of the first and second embodiments of this method, the first flowrate and the second flowrate result in a stoichiometric ratio less than about 1.0 in the barrel of the cyclone combustor.

There are multiple steps in the method for operating a steam-generating boiler or furnace in communication with a cyclone combustor having a burner in communication with a barrel having a longitudinal axis, a burner end adjacent the burner, and a throat end opposite the burner end. The first step is to feed a stream of the fuel into the barrel of the cyclone combustor at the burner end of the cyclone combustor. The second step is to feed at least one steam of a first oxidant having a first oxygen concentration of about 21 vol. % into the barrel of the cyclone combustor at a first flowrate, the at least one stream of the first oxidant comprising at least one predominant stream of the first oxidant. The third step is to feed at least one stream of a second oxidant having a second oxygen concentration greater than the first oxygen concentration into the barrel of the cyclone combustor at a second flowrate and in a selective manner, whereby a portion of the first oxidant in the barrel of the cyclone combustor combines with at least a portion of the second oxidant in the barrel of the cyclone combustor, thereby forming a combined oxidant having a combined oxygen concentration greater than the first oxygen concentration and less than the second oxygen concentration, and at least a portion of the first oxidant from the at least one predominant stream of the first oxidant in the barrel of the cyclone combustor continues having a first oxygen concentration. The fourth step is to combust at least a portion of the fuel in the barrel of the cyclone combustor with at least a portion of the combined oxidant in the barrel of the cyclone combustor, thereby generating an amount of thermal energy in the barrel of the cyclone combustor. The fifth step is to transfer at least a portion of the amount of the thermal energy from the barrel of the cyclone combustor to the steam-generating boiler or furnace.

There are multiple elements in a first embodiment of the system for combusting a fuel in a cyclone combustor having a burner in communication with a barrel having a longitudinal axis, a burner end adjacent the burner, and a throat end opposite the burner end. The first element is a means for feeding a stream of the fuel into the barrel of the cyclone combustor at the burner end of the cyclone combustor. The second element is a means for feeding at least one stream of a first oxidant having a first oxygen concentration of about 21 vol. % into the barrel of the cyclone combustor at a first flowrate, the at least one stream of the first oxidant comprising at least one predominant stream of the first oxidant. The third element is a means for feeding at least one stream of a second oxidant having a second oxygen concentration greater than the first oxygen concentration into the barrel of the cyclone combustor at a second flowrate and in a selective manner, whereby a portion of the first oxidant in the barrel of the cyclone combustor combines with at least a portion of the second oxidant in the barrel of the cyclone combustor, thereby forming a combined oxidant having a combined oxygen concentration greater than the fist oxygen concentration and less than the second oxygen concentration, and at least a portion of the first oxidant from the at least one predominant stream of the oxidant in the barrel of the cyclone combustor continues having the first oxygen concentration. The fourth element is a means for combusting at least a portion of the fuel in the barrel of the cyclone combustor with at least a portion of the fuel in the barrel of the cyclone combustor with at least a portion of the combined oxidant in the barrel of the cyclone combustor.

There are many variations of the first embodiment of the system for combusting a fuel in a cyclone combustor. In one variation, the fuel is coal. In another variation, the at least one stream of the first oxidant further comprises a primary oxidant stream having an oxygen concentration of about 21 vol. %, and at least a portion of the at least one stream of the second oxidant fed into the barrel of the cyclone combustor is combined with at least a portion of the primary oxidant stream. In yet another variation, the combined oxygen concentration is less than about 31 vol. %.

In another variation, at least a portion of the at least one stream of the second oxidant fed into the barrel of the cyclone combustor flows substantially along the longitudinal axis of the barrel of the cyclone combustor. In a variant of that variation, the at least a portion of the at least one stream of the second oxidant flowing substantially along the longitudinal axis of the barrel of the cyclone combustor has a swirling motion.

In another variation of the first embodiment of the system, at least a portion of the at least one stream of the second oxidant is fed into the barrel of the cyclone combustor at a location adjacent the burner end of the cyclone combustor. In yet another variation, at least a portion of the at least one stream of the second oxidant is fed into the barrel of the cyclone combustor at an intermediate location between the burner end and the throat end of the cyclone combustor. In still yet another variation, at least a portion of the at least one stream of the second oxidant is fed into the barrel of the cyclone combustor at another location adjacent the throat end of the cyclone combustor.

A second embodiment of the system for combusting a fuel in a cyclone combustor is a variation of the first embodiment and includes an additional element. In the second embodiment, the at least one stream of the first oxidant further comprises a primary oxidant stream having an oxygen concentration of about 21 vol. %. The additional element is a means for mixing at least a portion of the stream of the fuel with at least a portion of the primary oxidant stream to form a mixed stream, wherein at least a portion of the at least one stream of the second oxidant is fed into the barrel of the cyclone combustor at a location adjacent the mixed stream.

Another embodiment is a system for combusting a slagging coal with at least a first oxidant having a first oxygen concentration of about 21 vol. % and a second oxidant having a second oxygen concentration greater than the first oxygen concentration in a slagging cyclone combustor in communication with a furnace while minimizing an amount of nitrogen oxide emissions in a flue gas generated during combustion of the slagging coal, the slagging coal not being amenable to use in the slagging cyclone combustor operated with a flow of air as an only oxidant, the slagging cyclone combustor having a burner in communication with a barrel having a longitudinal axis, a burner end adjacent the burner and a throat end opposite the burner end. This embodiment has several elements. The first element is a means for feeding a stream of the slagging coal into the barrel of the slagging cyclone combustor at the burner end of the slagging cyclone combustor. The second element is a means for feeding at least one stream of the first oxidant into the barrel of the slagging cyclone combustor at a first flowrate, the at least one stream of the first oxidant including at least one predominant stream of the first oxidant. The third element is a means for feeding at least one stream of the first oxidant into the barrel of the slagging cyclone combustor at a second flowrate and in a selective manner, whereby a portion of the first oxidant in the barrel of the cyclone combustor combines with at least a portion of the second oxidant in the barrel of the slagging cyclone combustor, thereby forming a combined oxidant having a combined oxygen concentration greater than the first oxygen concentration and less than the second oxygen concentration, and at least a portion of the first oxidant stream from the at least one predominant stream of the first oxidant in the barrel of the slagging cyclone combustor continues having the first oxygen concentration. The fourth element is a means for combusting at least a portion of the slagging coal in the barrel of the slagging cyclone combustor with at least a portion of the first oxidant and at least a portion of the combined oxidant in the barrel of the slagging cyclone combustor, thereby generating the flue gas and a stable and continuous flow of a molten slag in the barrel of the slagging cyclone combustor. The fifth element is a means for draining at least a portion of the stable and continuous flow of the molten slag from the barrel of the slagging cyclone combustor. The sixth element is a means for transferring at least a portion of the flue gas from the barrel of the slagging cyclone combustor to the furnace.

There are several embodiments of the system for extending a range of amenable fuel types and operating parameters of a slagging cyclone combustor having a burner in communication with a barrel having a longitudinal axis, a burner end adjacent the burner, and a throat end opposite the burner end. The first embodiment of this system includes multiple elements. The first element is a means for feeding a stream of the fuel into the barrel of the slagging cyclone combustor of the burner end of the slagging cyclone combustor. The second element is a means for feeding at least one stream of a first oxidant having a first oxygen concentration of about 21 vol. % into the barrel of the slagging cyclone combustor at a first flowrate, the at least one stream of the first oxidant comprising at least one predominant stream of the first oxidant. The third element is a means for feeding at least one stream of a second oxidant having a second oxygen concentration greater than the first oxygen concentration into the barrel of the slagging cyclone combustor at a second flowrate and in a selective manner, whereby a portion of the first oxidant in the barrel of the slagging cyclone combustor combines with at least a portion of the second oxidant in the barrel of the slagging cyclone combustor, thereby forming a combined oxidant having a combined oxygen concentration greater than the first oxygen concentration and less than the second oxygen concentration, and at least a portion of the first oxidant from the at least one predominant stream of the first oxidant in the barrel of the slagging cyclone combustor continues having the first oxygen concentration. The fourth element is a means for combusting at least a portion of the fuel in the barrel of the slagging cyclone combustor with at least a portion of the combined oxidant in the barrel of the slagging cyclone combustor, thereby generating a plurality of products of combustion and a stable and continuous flow of a molten slag in the barrel of the slagging cyclone combustor.

The second embodiment of this system is similar to the first embodiment but includes the additional element of a means for draining at least a portion of the stable and continuous flow of the molten slag from the barrel of the slagging cyclone combustor. In a variation of the first and second embodiments of this system, the fuel is coal.

There also are several embodiments and variations of the system for reducing nitrogen oxide emissions from a flue gas generated during combustion of a fuel in a cyclone combustor having a burner in communication with a barrel having a longitudinal axis, the burner end adjacent the burner, and a throat end opposite the burner end. The first embodiment of the system includes multiple elements. The first element is a means for feeding a stream of the fuel into the barrel of the cyclone combustor at the burner end of the cyclone combustor. The second element is a means for feeding at least one stream of the first oxidant having a first oxygen concentration of about 21 vol. % into the barrel of the cyclone combustor at a first flowrate, the at least one stream of the first oxidant including at least one predominant stream of the first oxidant. The third element is a means for feeding at least one stream of a second oxidant having a second oxygen concentration greater than the first oxygen concentration into the barrel of the cyclone combustor at a second flowrate and in a selective manner, whereby a portion of the first oxidant in the barrel of the cyclone combustor combines with at least a portion of the second oxidant in the barrel of the cyclone combustor, thereby forming a combined oxidant having a combined oxygen concentration greater than the first oxygen concentration and less than the second oxygen concentration, and at least a portion of the oxidant from the at least one predominant stream of the first oxidant in the barrel of the cyclone combustor continues having the first oxygen concentration. The fourth element is a means for combusting at least a portion of the fuel in the barrel of the cyclone combustor with at least a portion of the combined oxidant in the barrel of the cyclone combustor, thereby generating the flue gas containing a reduced amount of nitrogen oxide in the barrel of the cyclone combustor, the reduced amount of nitrogen oxide being less than a higher amount of nitrogen oxide that would be generated by the cyclone combustor operated with a flow of air as an only oxidant.

A second embodiment of this system is similar to the first embodiment, with one variation, but includes three additional elements. The variation is that the throat end of the barrel of the cyclone combustor is in fluid communication with a furnace. The first additional element is a means for transferring at least a portion of the flue gas from the barrel of the cyclone combustor to the furnace. The second additional element is a means for feeding a stream of a secondary fuel into the furnace. The third additional element is a means for combusting at least a portion of the secondary fuel in the furnace.

In a variation of the first and second embodiments of this system, the first flowrate and the second flowrate result in a stoichiometric ratio less than about 1.0 in the barrel of the cyclone combustor.

There are multiple elements in the system for operating a steam-generating boiler or furnace in communication with a cyclone combustor having a burner in communication with a barrel having a longitudinal axis, a burner end adjacent the burner, and a throat end opposite the burner end. The first element is a means for feeding a stream of the fuel into the barrel of the cyclone combustor at the burner end of the cyclone combustor. The second element is a means for feeding at least one stream of a first oxidant having a first oxygen concentration of about 21 vol. % into the barrel of the cyclone combustor at a first flowrate, the at least one stream of the first oxidant including at least one predominant stream of the first oxidant. The third element is a means for feeding at least one stream of a second oxidant having a second oxygen concentration greater than the first oxygen concentration into the barrel of the cyclone combustor at a second flowrate and in a selective manner, whereby a portion of the first oxidant in the barrel of the cyclone combustor combines with at least a portion of the second oxidant in the barrel of the cyclone combustor, thereby forming a combined oxidant having a combined oxygen concentration greater than the first oxygen concentration and less than the second oxygen concentration, and at least a portion of the first oxidant from the at least one predominant stream of the first oxidant in the barrel of the cyclone combustor continues having the first oxygen concentration. The fourth element is a means for combusting at least a portion of the fuel in the barrel of the cyclone combustor with at least a portion of the combined oxidant in the barrel of the cyclone combustor, thereby generating an amount of thermal energy in the barrel of the cyclone combustor. The fifth element is a means for transferring at least a portion of the amount of the thermal energy from the barrel of the cyclone combustor to the steam-generating boiler or furnace.

BRIEF DESCRIPTION OF THE DRAWINGS

The invention will be described by way of example with reference to the accompanying drawings, in which.

DETAILED DESCRIPTION OF THE INVENTION

Figure 1:
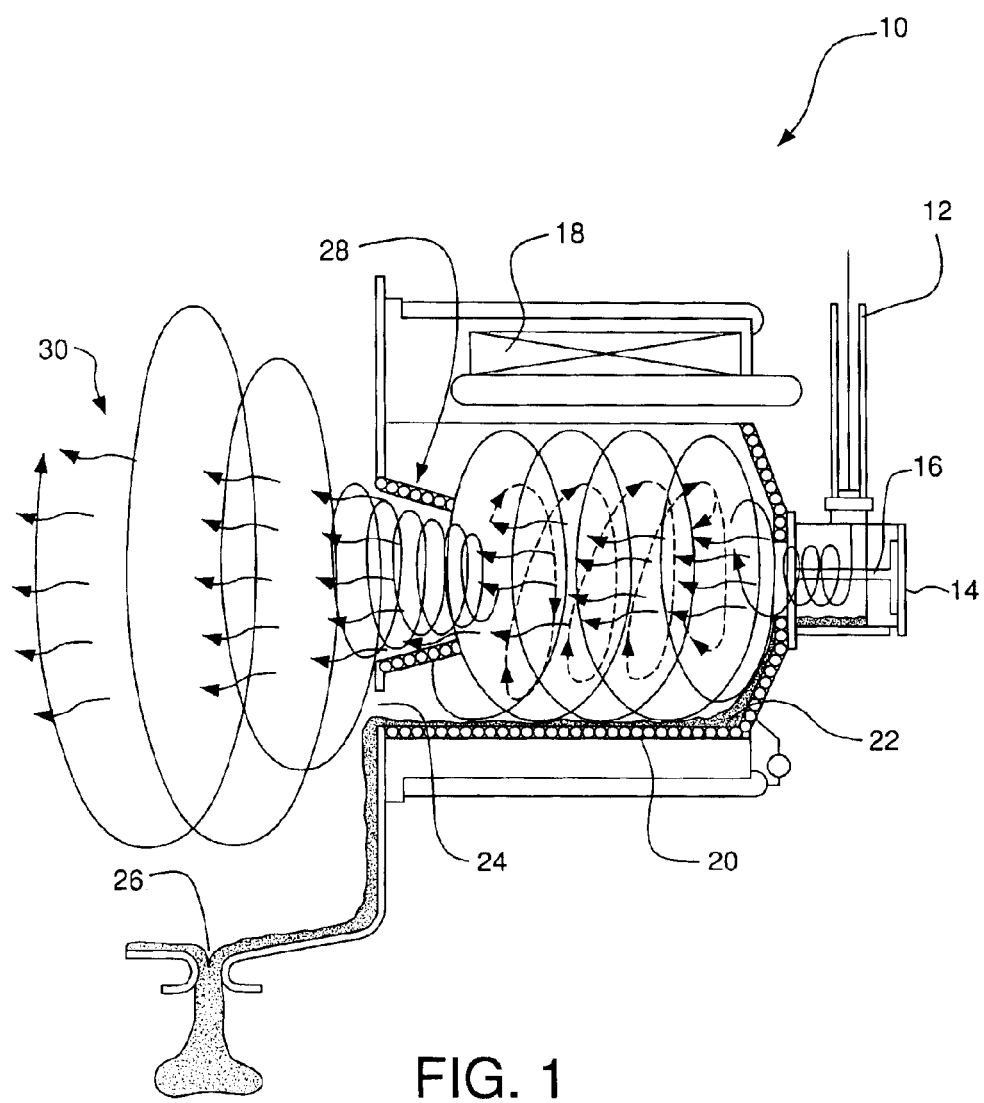
FIG. 1 is a schematic diagram illustrating a sectional view of a typical cyclone combustor in which incoming fuel particles are thrown to the walls of the barrel by centrifugal force.

The present invention is a method of combustion within a coal-fired slagging cyclone combustor with oxygen enrichment that allows for stable operation of the cyclone combustor with coals that, because of unfavorable ash fusibility/viscosity characteristics, are not amenable to conventional air-fuel slagging cyclone operation. The invention is also a method for extending the range of operating parameters of a slagging cyclone combustor (i.e., firing rate, stoichiometric ratio, coal grind size, etc.), while not adversely impacting boiler reliability or performance, by using selective oxygen enrichment to maintain a molten slag layer during conditions that would otherwise result in at least localized ash solidification.

The present invention is also a system and method for reducing NOx emissions in slagging cyclone combustors. One way that NOx is reduced is through expansion of the range of stable cyclone operation (i.e., the operating range within which slag remains molten and continuously flowing), through selective oxygen enrichment, toward operating modes that produce lower NOx levels.

An example of how this occurs is found in cyclone-fired boilers that utilize conventional reburn technology. In such systems, a secondary fuel, introduced downstream from the primary combustion zone (i.e., in the boiler furnace outside the cyclone barrel), converts NOx to $N_2$ via reaction with CH radicals. The degree of NOx reduction that can be achieved with conventional reburn technology increases as the ratio of reburn fuel to cyclone barrel fuel increases. At fixed boiler thermal load, an increase in reburn fuel can only be achieved at the expense of a reduction in cyclone barrel firing rate, a trend that, with air-fuel firing, eventually leads to lowering of the barrel temperatures and solidification of slag. Use of the present invention will lower NOx by substantially extending the attainable turn-down in barrel firing rate and, consequently, the proportion of reburn fuel utilized.

A second example of NOx reduction through expansion of the stable operating range corresponds to reduction of the stoichiometric ratio within the barrel. Prior art teaches the importance of fuel-rich (i.e., sub-stoichiometric) combustion in suppressing the reactions that tend to form NOx. Fuel-rich operation in cyclones, however, dilutes the combustion reaction, thus lowering slag temperatures, eventually to the point of slag solidification. The elevated combustion temperatures generated by the present invention remove this limitation, permitting more aggressive fuel-rich operation and consequently lower NOx emissions.

An alternate approach to NOx reduction embodied in the present invention is the incorporation of internal staging (i.e., staged or sequenced introduction) of oxygen within the barrel. This provides a degree of control over the mixing of coal and oxygen with cyclones not contemplated in the prior art. Hence, oxygen can, for example, be injected close to the inlet coal stream to accelerate the rate of devolatilization, or closer to the re-entrant throat, in order to facilitate final burnout of the particles. The optimal mode of internal staging, relative to NOx emissions and combustion efficiency, will depend on factors such as coal grind size, volatile fraction, firing rate and stoichiometric ratio. Prior art, which has focused on more prevalent, pulverized coal systems, does not teach or suggest such cyclone-specific methods for oxygen-enriched NOx reduction.

The present invention is also a system and a method of operating a coal-fired cyclone combustor in which oxygen is strategically added at select points within the combustor in order to achieve various benefits and results. The invention is grounded in a thorough understanding of fuel and oxidant flow patterns within the cyclone barrel, chemical and physical processes occurring in the combustion of carbonaceous fuels, and techniques for coupling these pieces of information in order to efficiently utilize oxygen to attain one or more of a wide array of benefits. The selective oxygen enrichment of this invention avoids the potential pitfalls and inefficiencies of relying exclusively on oxygen enrichment techniques that premix oxygen with the predominant oxidant stream entering the combustor. The term "predominant oxidant stream" as used herein refers to the oxidant stream with the highest mass flow rate which, in the case of cyclone combustors, is generally the secondary air stream (the main combustion air) which enters the cyclone combustor at the secondary air inlet 18 shown in FIG. 1. Premix techniques of this variety, although simple to apply, are generally less efficient since substantial dilution of the oxygen stream occurs.

Figure 2:
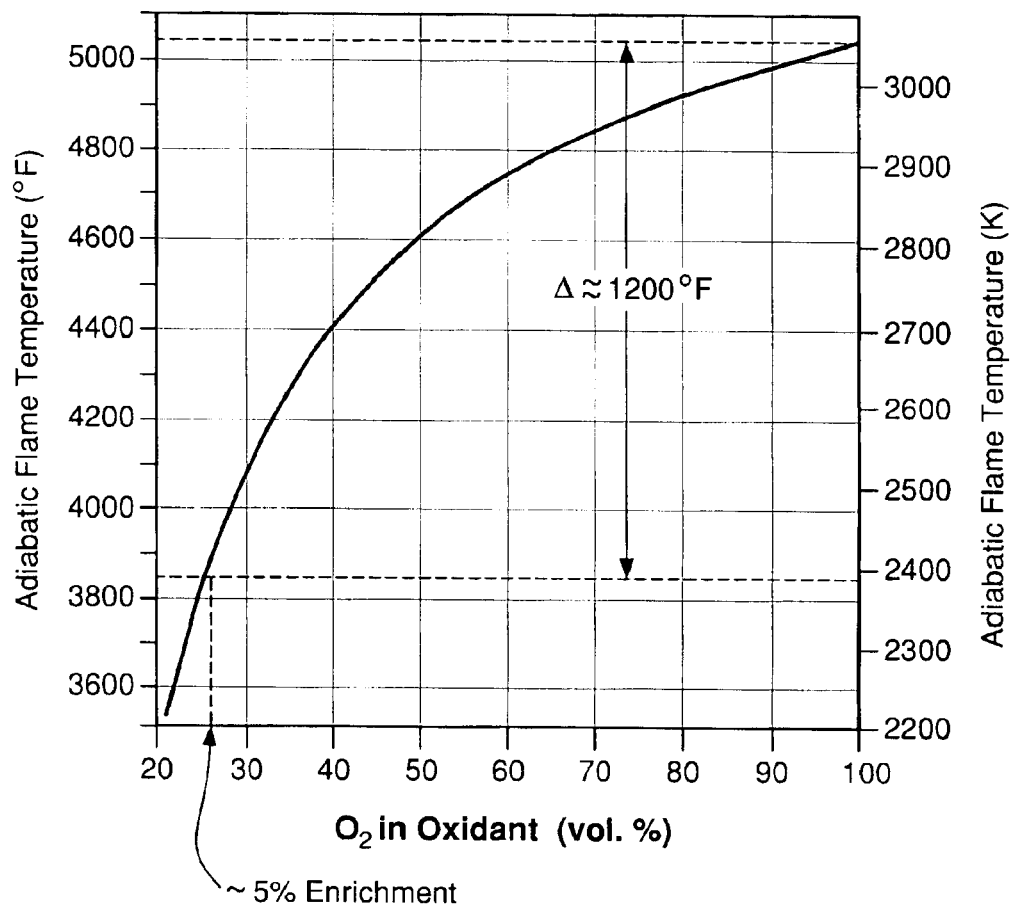
FIG. 2 is a graph of adiabatic flame temperature versus oxygen enrichment for a typical fossil fuel.
Figure 3:
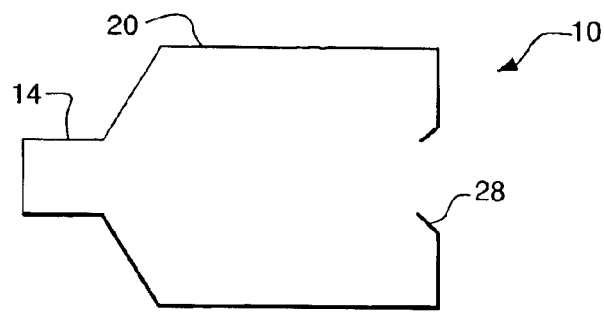
FIGS. 3, 4, and 5 are schematic diagrams illustrating a profile of a cyclone combustor, comprising a burner and a cyclone barrel having a re-entrant throat, utilizing the present invention.
Figure 3A:
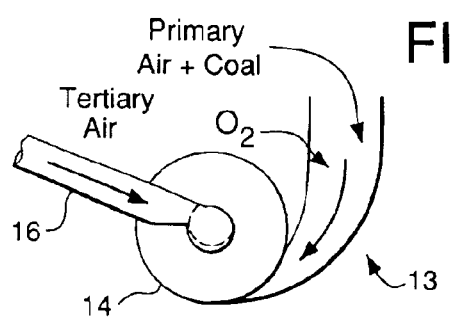
FIGS. 3A–3F are schematic diagrams illustrating end views (3A, 3C, 3E) and side views (3B, 3D, 3F) for several variations of one embodiment of the invention wherein oxygen is injected into the barrel at a location adjacent to the primary air/coal stream.
Figure 3B:
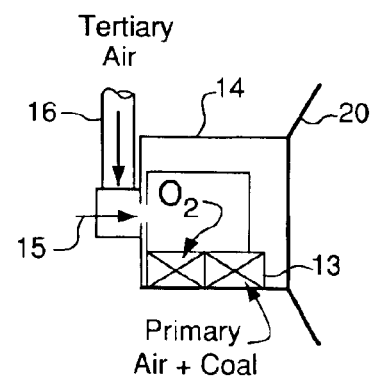
Figure 3C:
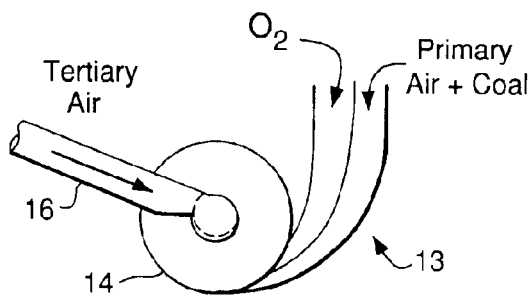
Figure 3D:
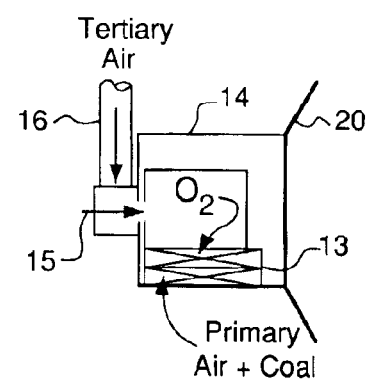
Figure 3E:
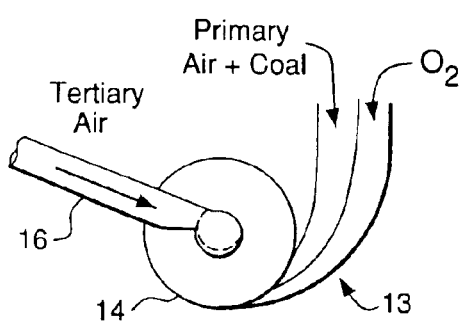
Figure 3F:
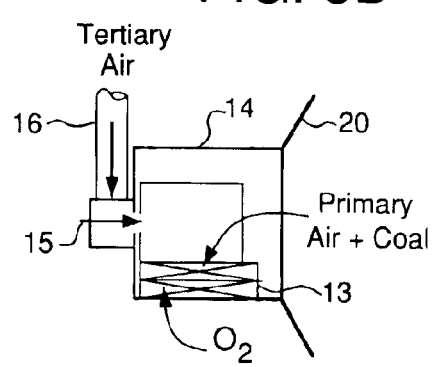

The relative efficiency of selective oxygen enrichment of the present invention, and premixing of oxygen in the predominant oxidant stream can, on one level, be understood by considering the respective impact on flame temperature. A graph of adiabatic flame temperature versus oxygen enrichment for a typical fossil fuel is shown in FIG. 2. With premixing of oxygen and air, the average enrichment level of the oxidant stream limits the increase in flame temperature. For example, with five percent pre-mixed enrichment, a maximum increase in adiabatic flame temperature (above air-fuel combustion) of 400–500° F. can be achieved. By contrast, strategic injection of an essentially pure oxygen stream with coal is capable of elevating the flame temperature locally by as much as 1500° F. As radiation heat transfer is proportional to absolute temperature to the fourth power, it is clear that the radiant heat delivered to the slag layer has the potential to be far greater with selective oxygen enrichment such as that of the present invention. Moreover, as combustion kinetics are exponentially related to flame temperature, more complete carbon burnout can be achieved with the present invention.

Further, as premixing of the predominant oxidant stream has a global effect within the cyclone barrel, rather than a local effect as produced by the selective oxygen enrichment of the present invention, a degree of control in the mixing processes between fuel and oxidant is lost. Hence, when enrichment is carried out by premixing oxygen with the predominant oxidant stream (as contrasted with selective oxygen enrichment of the present invention), it is much more difficult to precisely isolate phenomena and attain desired results without inadvertently producing undesired or unintended side-effects.

Although the specific methods of oxygen enrichment will vary with factors such as cyclone/boiler design, load profile, coal characteristics, and the particular benefits sought, the following techniques are among those within the scope of the present invention.

Primary air is often (but not always) used as the transport medium for the crushed coal introduced into the cyclone and typically represents about 10–20% of the stoichiometric air required for complete combustion. In such designs, the primary air/coal stream enters the cyclone with a tangential orientation with respect to the barrel.

FIGS. 3 and 3A–3F show three variations of an embodiment of the present invention wherein oxygen is injected into the barrel 20 via the burner 14 with the primary air/coal stream. Tertiary air is injected into the tertiary air inlet 16 and enters the burner 14 through an orifice 15 in all three variations. In the variation shown in FIGS. 3A and 3B, a stream of oxygen is injected side-by-side with the primary air/coal stream into the burner via conduit 13. In the second variation illustrated in FIGS. 3C and 3D, a stream of oxygen is injected above the primary air/coal stream. In the third variation shown in FIGS. 3E and 3F, a stream of oxygen is injected below the primary air/coal stream. In all three variations, the oxygen stream is injected adjacent to the primary air/coal stream and with a similarly oriented swirling motion as that of the primary air/coal stream.

Figure 4:
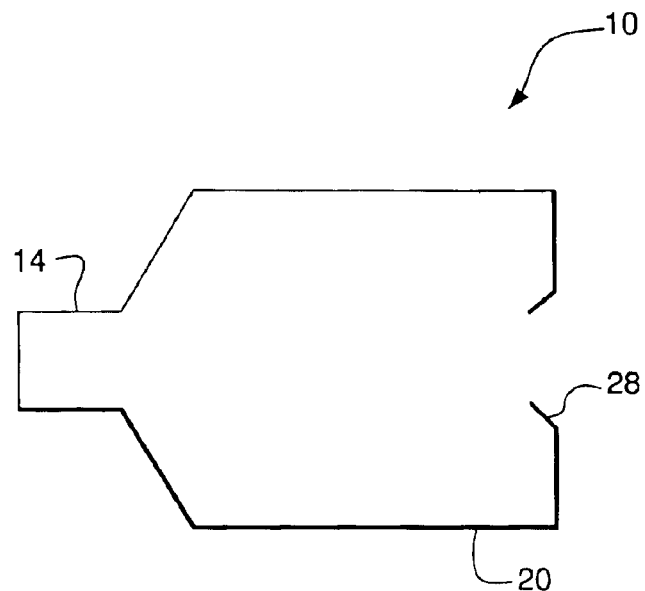
Figure 4A:
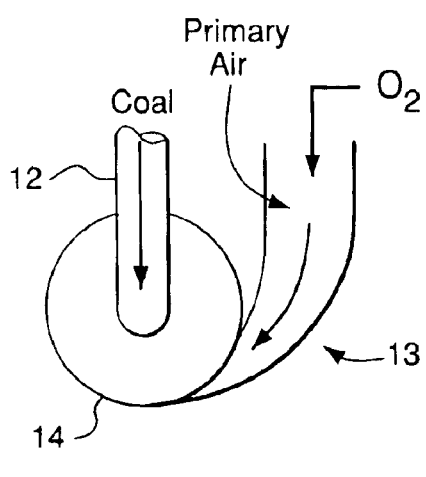
FIGS. 4A and 4B are schematic diagrams illustrating an end view (4A) and a side view (4B) for another embodiment of the invention wherein oxygen is injected into the barrel with the primary air stream.
Figure 4B:
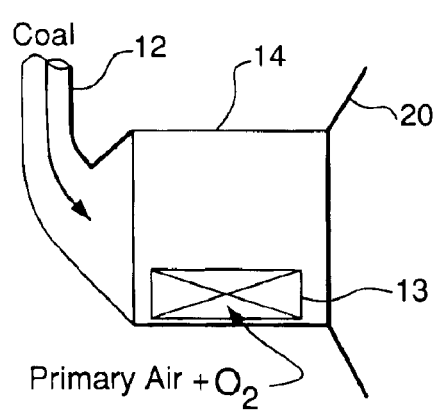

FIGS. 4 and 4A–4B show another embodiment of the invention in a system wherein primary air and coal enter the burner 14 separately through conduit 13 and coal pipe 12. In this embodiment, a stream of oxygen is added directly to the primary air stream, and both streams enter the burner through conduit 13.

The oxygen enrichment techniques shown in FIGS. 3A–3F and FIGS. 4A–4B provide intimate, essentially undiluted contact between the coal and oxygen with little or no disturbance to existing cyclone flow patterns. This mode of oxygen enrichment will therefore generate high temperatures, providing enhanced radiation heat transfer to the slag and initiating rapid devolatilization of coal in the early stages of combustion. Rapid devolatilization, when coupled with locally fuel-rich conditions, is an established means for lowering NOx emissions in coal-fired systems.

Figure 5:
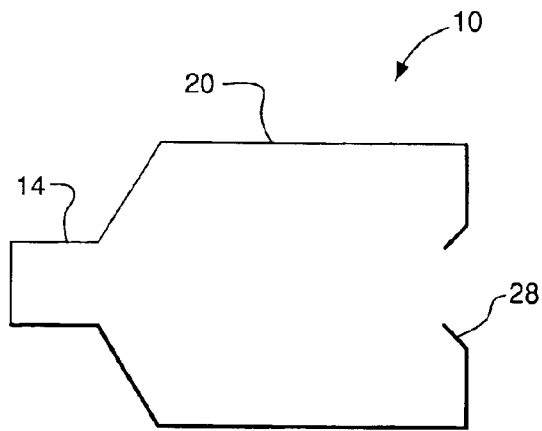
Figure 5A:
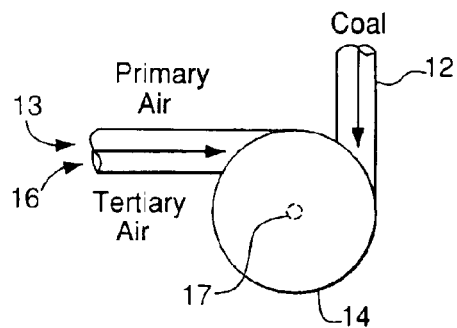
FIGS. 5A–5D are schematic diagrams illustrating end views (5A, 5C) and side views (5B, 5D) for several variations of another embodiment of the invention wherein oxygen is injected into the barrel of the cyclone combustor along the longitudinal axis of the barrel with a swirling motion in one variation (FIG. 5D) and without a swirling motion in another variation (FIG. 5B)
Figure 5B:
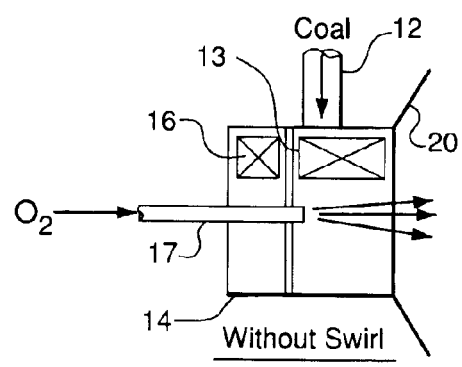
Figure 5C:
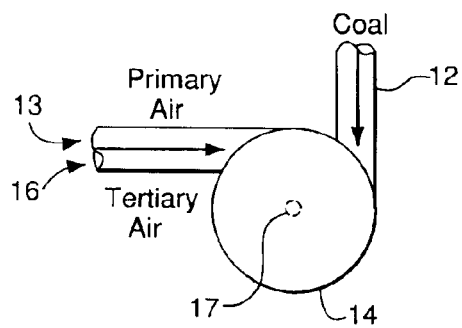
Figure 5D:
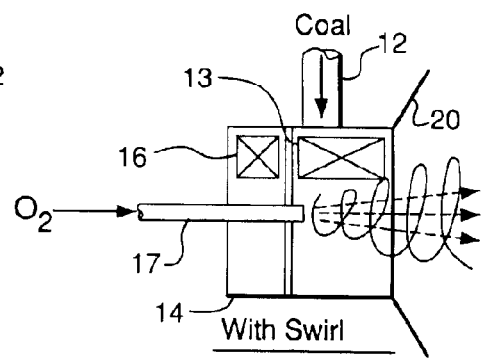

In another embodiment, oxygen is injected along the axis of the barrel 20 toward the re-entrant throat 28, as shown in FIGS. 5A–5D. This provides a source of improved burnout for fine coal particles that would otherwise exit the barrel un-reacted, for example as is prone to occur with low viscosity slag produced by some coals, especially some Western U.S. coals. The combustion of fines will, in turn, augment the rate of radiant heat to the slag layer. Axial injection of oxygen, without swirl and with swirl, is shown in FIGS. 5B and 5D.

In the embodiment shown in FIGS. 5A and 5B, coal is injected through the coal pipe 12, primary air is injected through conduit 13, tertiary air is injected through tertiary air inlet 16, and oxygen is injected into the burner 14 through a lance 17. Alternatively, the oxygen may be pre-mixed with the tertiary air and injected together with the tertiary air at the tertiary air inlet 16.

In the embodiment shown in FIGS. 5C and 5D, a swirling motion is imparted to the axial injection of oxygen that is of the same orientation as the primary air or primary air/coal stream. The swirling action diffuses the oxygen outward toward the larger coal particles. The swirl number (ratio of tangential to axial momentum) of the centerline oxygen flow can be varied to control the rate of jet expansion and, hence, the predominant region of the barrel in which mixing of oxygen and coal occurs.

Figure 6A:
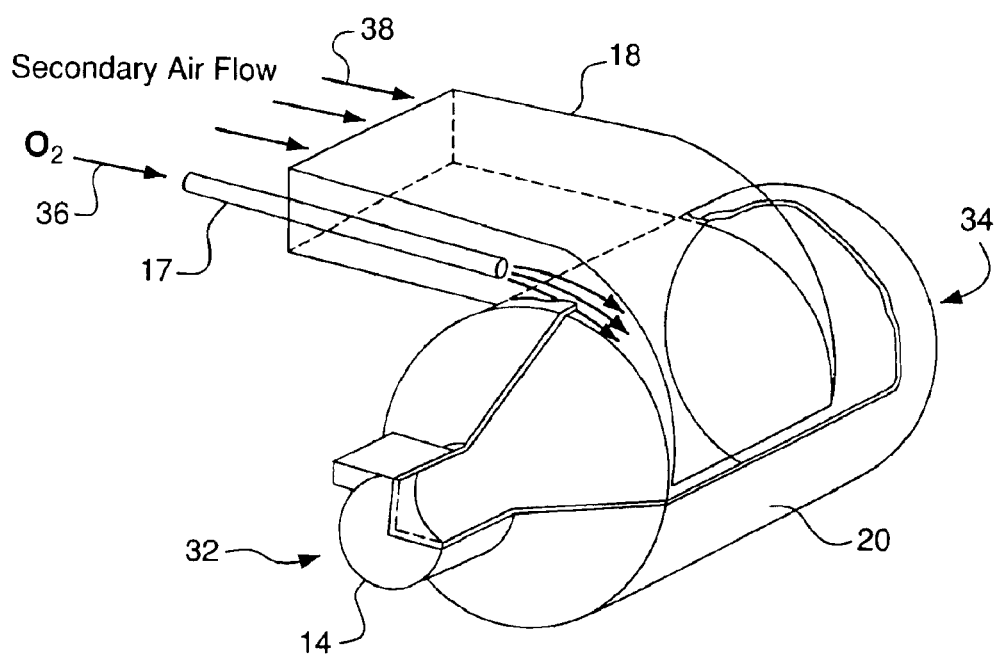
FIG. 6A is a schematic diagram illustrating another embodiment of the invention wherein oxygen is injected into the barrel of the cyclone combustor near the burner end.
Figure 6B:
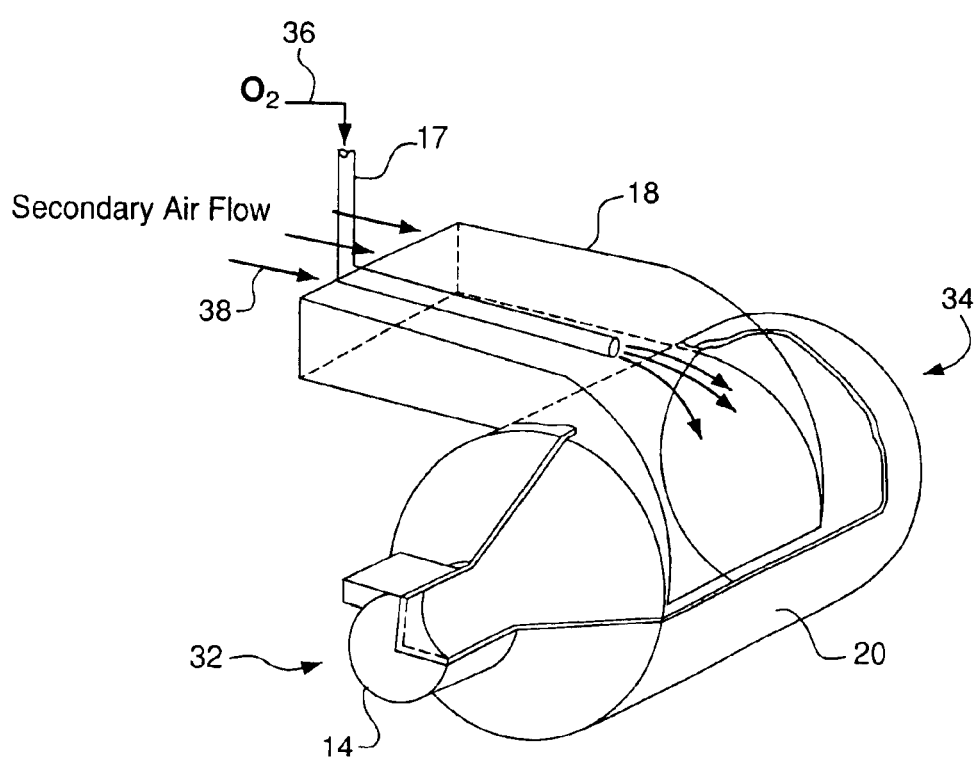
FIG. 6B is a schematic diagram illustrating another embodiment of the invention wherein oxygen is injected into the mid-section of the barrel of the cyclone combustor.
Figure 6C:
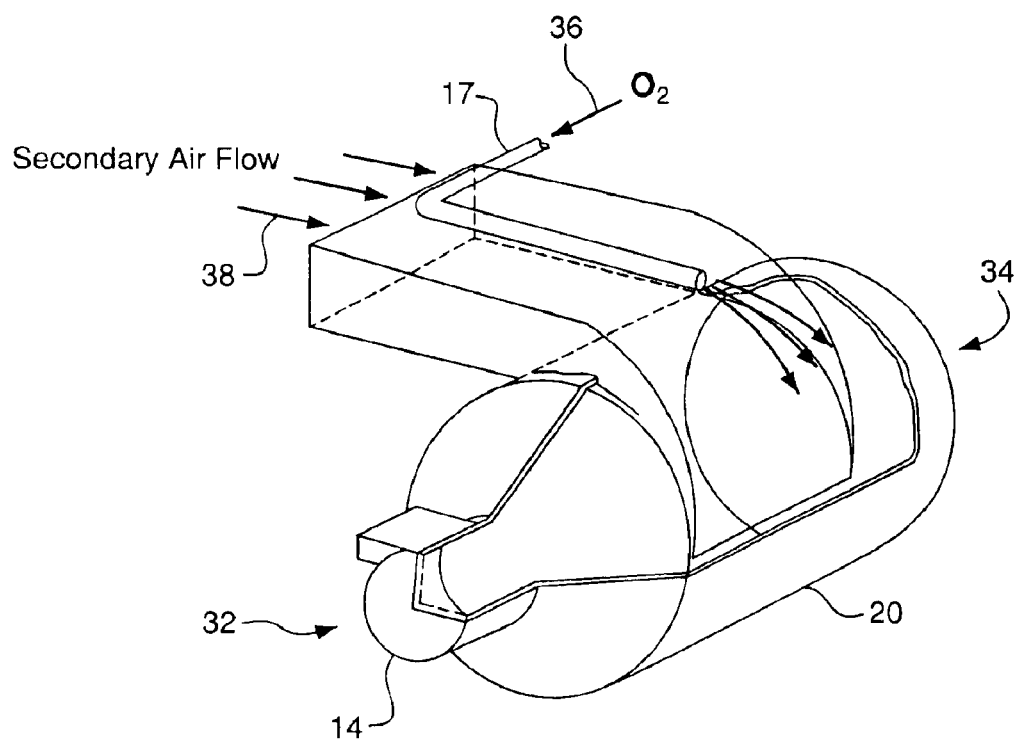
FIG. 6C is a schematic diagram illustrating another embodiment of the invention wherein oxygen is injected into the barrel of the cyclone combustor near the throat end.

In the embodiments shown in FIGS. 6A–6C, oxygen is introduced at various points downstream from the primary air/coal injection point, either within or adjacent to the secondary air stream, and typically following the same swirl orientation as the secondary air. This method of enrichment provides an additional level of mixing control between the oxygen and the coal. That is, varying the position of oxygen enrichment along the barrel length assists in determining the time-temperature-$O_2$ concentration history of the individual coal particles as they traverse the barrel. This degree of control, if properly leveraged, can be used to reduce NOx emissions, locally augment radiant heat transfer, and enhance carbon particle burnout, while maintaining the slag layer in a molten and continuously flowing state.

In the embodiment shown in FIG. 6A, a stream of oxygen 36 is injected into a lance 17 inserted in the secondary air inlet 18 at a point near the burner end 32 of the cyclone barrel 20, which has a burner 14 at the burner end 32 of the cyclone barrel. The oxygen flows into the barrel together with the secondary air flow 38.

In FIG. 6B, the stream of oxygen 36 is injected through the lance 17 inserted through the secondary air inlet 18 at a location approximately in the middle of the barrel 20. The oxygen flows into the barrel together with the secondary air flow 38.

In FIG. 6C, the stream of oxygen 36 is injected in lance 17 inserted in the secondary air inlet 18 at a location near the throat end 34 of the cyclone barrel 20. The oxygen flows into the barrel together with the secondary air flow 38.

Persons skilled in the art will recognize that the lance 17 illustrated in FIGS. 6A, 6B, and 6C may be replaced by any means that will facilitate selective oxygen enrichment in localized regions of the cyclone barrel.

While specific embodiments of the present invention have been described in detail, persons skilled in the art will appreciate that various modifications and alterations may be developed in light of the overall teachings of the disclosure. For example, the invention may be used with many types of carbonaceous fuels, including but not limited to: anthracite, bituminous, sub-bituminous, and lignitic coals; tar and emulsions thereof; bitumen and emulsions thereof; petroleum coke; petroleum oils and emulsions thereof; water and/or oil slurries of coal; paper mill sludge solids and sewage sludge solids; and combinations and mixtures of all of those fuels.

Accordingly, although illustrated and described herein with reference to certain specific embodiments and variations thereof, the present invention is nevertheless not intended to be limited to the details shown and described. Rather, various modifications may be made in the details within the scope and range of equivalents of the claims and without departing from the spirit of the invention.

What is claimed is:

1. A method for combusting a fuel in a cyclone combustor having a burner in communication with a barrel having a longitudinal axis, a burner end adjacent the burner, and a throat end opposite the burner end, comprising the steps of:

feeding a stream of the fuel into the barrel of the cyclone combustor at the burner end of the cyclone combustor;

feeding at least one stream of a first oxidant having a first oxygen concentration of about 21 vol. % into the barrel of the cyclone combustor at a first flowrate, the at least one stream of the first oxidant comprising at least one predominant stream of the first oxidant;

feeding at least one stream of a second oxidant having a second oxygen concentration greater than the first oxygen concentration into the barrel of the cyclone combustor at a second flowrate and in a selective manner, whereby a portion of the first oxidant in the barrel of the cyclone combustor combines with at least a portion of the second oxidant in the barrel of the cyclone combustor, thereby forming a combined oxidant having a combined oxygen concentration greater than the first oxygen concentration and less than the second oxygen concentration, and at least a portion of the first oxidant from the at least one predominant stream of the first oxidant in the barrel of the cyclone combustor continues having the first oxygen concentration; and combusting at least a portion of the fuel in the barrel of the cyclone combustor with at least a portion of the combined oxidant in the barrel of the cyclone combustor.

2. A method as in claim 1, wherein the fuel is coal.

3. A method as in claim 1, wherein the at least one stream of the first oxidant further comprises a primary oxidant stream having an oxygen concentration of about 21 vol. %, comprising the further step of:

mixing at least a portion of the stream of the fuel with at least a portion of the primary oxidant stream to form a mixed stream, wherein at least a portion of the at least one stream of the second oxidant is fed into the barrel of the cyclone combustor at a first location adjacent the mixed stream.

4. A method as in claim 1, wherein the at least one stream of the first oxidant further comprises a primary oxidant stream having an oxygen concentration of about 21 vol. %, and wherein at least a portion of the at least one stream of the second oxidant fed into the barrel of the cyclone combustor is combined with at least a portion of the primary oxidant stream.

5. A method as in claim 1, wherein at least a portion of the at least one stream of the second oxidant fed into the barrel of the cyclone combustor flows substantially along the longitudinal axis of the barrel of the cyclone combustor.

6. A method as in claim 5, wherein the at least a portion of the at least one stream of the second oxidant flowing substantially along the longitudinal axis of the barrel of the cyclone combustor has a swirling motion.

7. A method as in claim 1, wherein at least a portion of the at least one stream of the second oxidant is fed into the barrel of the cyclone combustor at a second location adjacent the burner end of the cyclone combustor.

8. A method as in claim 1, wherein at least a portion of the at least one stream of the second oxidant is fed into the barrel of the cyclone combustor at an intermediate location between the burner end and the throat end of the cyclone combustor.

9. A method as in claim 1, wherein at least a portion of the at least one stream of the second oxidant is fed into the barrel of the cyclone combustor at a third location adjacent the throat end of the cyclone combustor.

10. A method as in claim 1, wherein the combined oxygen concentration is less than about 31 vol. %.

11. A method for combusting a slagging coal with at least a first oxidant having a first oxygen concentration of about 21 vol. % and a second oxidant having a second oxygen concentration greater than the first oxygen concentration in a slagging cyclone combustor in communication with a furnace while minimizing an amount of nitrogen oxide emissions in a flue gas generated during combustion of the slagging coal, said slagging coal not being amenable to use in the slagging cyclone combustor operated with a flow of air as an only oxidant, the slagging cyclone combustor having a burner in communication with a barrel having a longitudinal axis, a burner end adjacent the burner, and a throat end opposite the burner end, comprising the steps of:

feeding a stream of the slagging coal into the barrel of the slagging cyclone combustor at the burner end of the slagging cyclone combustor;

feeding at least one stream of the first oxidant into the barrel of the slagging cyclone combustor at a first flowrate, the at least one stream of the first oxidant comprising at least one predominant stream of the first oxidant;

feeding at least one stream of the second oxidant into the barrel of the slagging cyclone combustor at a second flowrate and in a selective manner, whereby a portion of the first oxidant in the barrel of the slagging cyclone combustor combines with at least a portion of the second oxidant in the barrel of the slagging cyclone combustor, thereby forming a combined oxidant having a combined oxygen concentration greater than the first oxygen concentration and less than the second oxygen concentration, and at least a portion of the first oxidant from the at least one predominant stream of the first oxidant in the barrel of the slagging cyclone combustor continues having the first oxygen concentration;

combusting at least a portion of the slagging coal in the barrel of the slagging cyclone combustor with at least a portion of the first oxidant and at least a portion of the combined oxidant in the barrel of the slagging cyclone combustor, thereby generating the flue gas and a stable and continuous flow of a molten slag in the barrel of the slagging cyclone combustor;

draining at least a portion of the stable and continuous flow of the molten slag from the barrel of the slagging cyclone combustor; and transferring at least a portion of the flue gas from the barrel of the slagging cyclone combustor to the furnace.

12. A method for extending a range of amenable fuel types and operating parameters of a slagging cyclone combustor having a burner in communication with a barrel having a longitudinal axis, a burner end adjacent the burner, and a throat end opposite the burner end, comprising the steps of:

feeding a stream of the fuel into the barrel of the slagging cyclone combustor at the burner end of the slagging cyclone combustor;

feeding at least one stream of a first oxidant having a first oxygen concentration of about 21 vol. % into the barrel of the slagging cyclone combustor at a first flowrate, the at least one stream of the first oxidant comprising at least one predominant stream of the first oxidant;

feeding at least one stream of a second oxidant having a second oxygen concentration greater than the first oxygen concentration into the barrel of the slagging cyclone combustor at a second flowrate and in a selective manner, whereby a portion of the first oxidant in the barrel of the slagging cyclone combustor combines with at least a portion of the second oxidant in the barrel of the slagging cyclone combustor, thereby forming a combined oxidant having a combined oxygen concentration greater than the first oxygen concentration and less than the second oxygen concentration, and at least a portion of the first oxidant from the at least one predominant stream of the first oxidant in the barrel of the slagging cyclone combustor continues having the first oxygen concentration; and combusting at least a portion of the fuel in the barrel of the slagging cyclone combustor with at least a portion of the combined oxidant in the barrel of the slagging cyclone combustor, thereby generating a plurality of products of combustion and a stable and continuous flow of a molten slag in the barrel of the slagging cyclone combustor.

13. A method as in claim 12, comprising the further step of:

draining at least a portion of the stable and continuous flow of the molten slag from the barrel of the slagging cyclone combustor.

14. A method as in claim 12, wherein the fuel is coal.

15. A method for reducing nitrogen oxide emissions from a flue gas generated during combustion of a fuel in a cyclone combustor having a burner in communication with a barrel having a longitudinal axis, a burner end adjacent the burner, and a throat end opposite the burner end, comprising the steps of:

feeding a stream of the fuel into the barrel of the cyclone combustor at the burner end of the cyclone combustor;

feeding at least one stream of a first oxidant having a first oxygen concentration of about 21 vol. % into the barrel of the cyclone combustor at a first flowrate, the at least one stream of the first oxidant comprising at least one predominant stream of the first oxidant;

feeding at least one stream of a second oxidant having a second oxygen concentration greater than the first oxygen concentration into the barrel of the cyclone combustor at a second flowrate and in a selective manner, whereby a portion of the first oxidant in the barrel of the cyclone combustor combines with at least a portion of the second oxidant in the barrel of the cyclone combustor, thereby forming a combined oxidant having a combined oxygen concentration greater than the first oxygen concentration and less than the second oxygen concentration, and at least a portion of the first oxidant from the at least one predominant stream of the first oxidant in the barrel of the cyclone combustor continues having the first oxygen concentration; and combusting at least a portion of the fuel in the barrel of the cyclone combustor with at least a portion of the combined oxidant in the barrel of the cyclone combustor, thereby generating the flue gas containing a reduced amount of nitrogen oxide in the barrel of the cyclone combustor, said reduced amount of nitrogen oxide being less than a higher amount of nitrogen oxide that would be generated by the cyclone combustor operated with a flow of air as an only oxidant.

16. A method as in claim 15, wherein the throat end of the barrel of the cyclone combustor is in fluid communication with a furnace, comprising the further steps of:

transferring at least a portion of the flue gas from the barrel of the cyclone combustor to the furnace;

feeding a stream of a secondary fuel into the furnace; and combusting at least a portion of the secondary fuel in the furnace.

17. A method as in claim 15, wherein the first flowrate and the second flowrate result in a stoichiometric ratio less than about 1.0 in the barrel of the cyclone combustor.

18. A method for operating a steam-generating boiler or furnace in communication with a cyclone combustor having a burner in communication with a barrel having a longitudinal axis, a burner end adjacent the burner, and a throat end opposite the burner end, comprising the steps of:

feeding a stream of the fuel into the barrel of the cyclone combustor at the burner end of the cyclone combustor;

feeding at least one stream of a first oxidant having a first oxygen concentration of about 21 vol. % into the barrel of the cyclone combustor at a first flowrate, the at least one stream of the first oxidant comprising at least one predominant stream of the first oxidant;

feeding at least one stream of a second oxidant having a second oxygen concentration greater than the first oxygen concentration into the barrel of the cyclone combustor at a second flowrate and in a selective manner, whereby a portion of the first oxidant in the barrel of the cyclone combustor combines with at least a portion of the second oxidant in the barrel of the cyclone combustor, thereby forming a combined oxidant having a combined oxygen concentration greater than the first oxygen concentration and less than the second oxygen concentration, and at least a portion of the first oxidant from the at least one predominant stream of the first oxidant in the barrel of the cyclone combustor continues having the first oxygen concentration;

combusting at least a portion of the fuel in the barrel of the cyclone combustor with at least a portion of the combined oxidant in the barrel of the cyclone combustor, thereby generating an amount of thermal energy in the barrel of the cyclone combustor; and transferring at least a portion of the amount of thermal energy from the barrel of the cyclone combustor to the steam-generating boiler or furnace.

19. A system for combusting a fuel in a cyclone combustor having a burner in communication with a barrel having a longitudinal axis, a burner end adjacent the burner, and a throat end opposite the burner end, comprising:

means for feeding a stream of the fuel into the barrel of the cyclone combustor at the burner end of the cyclone combustor;

means for feeding at least one stream of a first oxidant having a first oxygen concentration of about 21 vol. % into the barrel of the cyclone combustor at a first flowrate, the at least one stream of the first oxidant comprising at least one predominant stream of the first oxidant;

means for feeding at least one stream of a second oxidant having a second oxygen concentration greater than the first oxygen concentration into the barrel of the cyclone combustor at a second flowrate and in a selective manner, whereby a portion of the first oxidant in the barrel of the cyclone combustor combines with at least a portion of the second oxidant in the barrel of the cyclone combustor, thereby forming a combined oxidant having a combined oxygen concentration greater than the first oxygen concentration and less than the second oxygen concentration, and at least a portion of the first oxidant from the at least one predominant stream of the first oxidant in the barrel of the cyclone combustor continues having the first oxygen concentration; and means for combusting at least a portion of the fuel in the barrel of the cyclone combustor with at least a portion of the combined oxidant in the barrel of the cyclone combustor.

20. A system as in claim 19, wherein the fuel is coal.

21. A system as in claim 19, wherein the at least one stream of the first oxidant further comprises a primary oxidant stream having an oxygen concentration of about 21 vol. %, further comprising:

means for mixing at least a portion of the stream of the fuel with at least a portion of the primary oxidant stream to form a mixed stream, wherein at least a portion of the at least one stream of the second oxidant is fed into the barrel of the cyclone combustor at a first location adjacent the mixed stream.

22. A system as in claim 19, wherein the at least one stream of the first oxidant further comprises a primary oxidant stream having an oxygen concentration of about 21 vol. %, and wherein at least a portion of the at least one stream of the second oxidant fed into the barrel of the cyclone combustor is combined with at least a portion of the primary oxidant stream.

23. A system as in claim 19, wherein at least a portion of the at least one stream of the second oxidant fed into the barrel of the cyclone combustor flows substantially along the longitudinal axis of the barrel of the cyclone combustor.

24. A system as in claim 23, wherein the at least a portion of the at least one stream of the second oxidant flowing substantially along the longitudinal axis of the barrel of the cyclone combustor has a swirling motion.

25. A system as in claim 19, wherein at least a portion of the at least one stream of the second oxidant is fed into the barrel of the cyclone combustor at a second location adjacent the burner end of the cyclone combustor.

26. A system as in claim 19, wherein at least a portion of the at least one stream of the second oxidant is fed into the barrel of the cyclone combustor at an intermediate location between the burner end and the throat end of the cyclone combustor.

27. A system as in claim 19, wherein at least a portion of the at least one stream of the second oxidant is fed into the barrel of the cyclone combustor at a third location adjacent the throat end of the cyclone combustor.

28. A system as in claim 19, wherein the combined oxygen concentration is less than about 31 vol. %.

29. A system for combusting a slagging coal with at least a first oxidant having a first oxygen concentration of about 21 vol. % and a second oxidant having a second oxygen concentration greater than the first oxygen concentration in a slagging cyclone combustor in communication with a furnace while minimizing an amount of nitrogen oxide emissions in a flue gas generated during combustion of the slagging coal, said slagging coal not being amenable to use in the slagging cyclone combustor operated with a flow of air as an only oxidant, the slagging cyclone combustor having a burner in communication with a barrel having a longitudinal axis, a burner end adjacent the burner, and a throat end opposite the burner end, comprising:

means for feeding a stream of the slagging coal into the barrel of the slagging cyclone combustor at the burner end of the slagging cyclone combustor;

means for feeding at least one stream of the first oxidant into the barrel of the slagging cyclone combustor at a first flowrate, the at least one stream of the first oxidant comprising at least one predominant stream of the first oxidant;

means for feeding at least one stream of the second oxidant into the barrel of the slagging cyclone combustor at a second flowrate and in a selective manner, whereby a portion of the first oxidant in the barrel of the cyclone combustor combines with at least a portion of the second oxidant in the barrel of the slagging cyclone combustor, thereby forming a combined oxidant having a combined oxygen concentration greater than the first oxygen concentration and less than the second oxygen concentration, and at least a portion of the first oxidant from the at least one predominant stream of the first oxidant in the barrel of the slagging cyclone combustor continues having the first oxygen concentration;

means for combusting at least a portion of the slagging coal in the barrel of the slagging cyclone combustor with at least a portion of the first oxidant and at least a portion of the combined oxidant in the barrel of the slagging cyclone combustor, thereby generating the flue gas and a stable and continuous flow of a molten slag in the barrel of the slagging cyclone combustor;

means for draining at least a portion of the stable and continuous flow of the molten slag from the barrel of the slagging cyclone combustor; and means for transferring at least a portion of the flue gas from the barrel of the slagging cyclone combustor to the furnace.

30. A system for extending a range of amenable fuel types and operating parameters of a slagging cyclone combustor having a burner in communication with a barrel having a longitudinal axis, a burner end adjacent the burner, and a throat end opposite the burner end, comprising:

means for feeding a stream of the fuel into the barrel of the slagging cyclone combustor at the burner end of the slagging cyclone combustor;

means for feeding at least one stream of a first oxidant having a first oxygen concentration of about 21 vol. % into the barrel of the slagging cyclone combustor at a first flowrate, the at least one stream of the first oxidant comprising at least one predominant stream of the first oxidant;

means for feeding at least one stream of a second oxidant having a second oxygen concentration greater than the first oxygen concentration into the barrel of the slagging cyclone combustor at a second flowrate and in a selective manner, whereby a portion of the first oxidant in the barrel of the slagging cyclone combustor combines with at least a portion of the second oxidant in the barrel of the slagging cyclone combustor, thereby forming a combined oxidant having a combined oxygen concentration greater than the first oxygen concentration and less than the second oxygen concentration, and at least a portion of the first oxidant from the at least one predominant stream of the first oxidant in the barrel of the slagging cyclone combustor continues having the first oxygen concentration; and means for combusting at least a portion of the fuel in the barrel of the slagging cyclone combustor with at least a portion of the combined oxidant in the barrel of the slagging cyclone combustor, thereby generating a plurality of products of combustion and a stable and continuous flow of a molten slag in the barrel of the slagging cyclone combustor.

31. A system as in claim 30, further comprising:

means for draining at least a portion of the stable and continuous flow of the molten slag from the barrel of the slagging cyclone combustor.

32. A system as in claim 30, wherein the fuel is coal.

33. A system for reducing nitrogen oxide emissions from a flue gas generated during combustion of a fuel in a cyclone combustor having a burner in communication with a barrel having a longitudinal axis, a burner end adjacent the burner, and a throat end opposite the burner end, comprising:

means for feeding a stream of the fuel into the barrel of the cyclone combustor at the burner end of the cyclone combustor;

means for feeding at least one stream of a first oxidant having a first oxygen concentration of about 21 vol. % into the barrel of the cyclone combustor at a first flowrate, the at least one stream of the first oxidant comprising at least one predominant stream of the first oxidant;

means for feeding at least one stream of a second oxidant having a second oxygen concentration greater than the first oxygen concentration into the barrel of the cyclone combustor at a second flowrate and in a selective manner, whereby a portion of the first oxidant in the barrel of the cyclone combustor combines with at least a portion of the second oxidant in the barrel of the cyclone combustor, thereby forming a combined oxidant having a combined oxygen concentration greater than the first oxygen concentration and less than the second oxygen concentration, and at least a portion of the first oxidant from the at least one predominant stream of the first oxidant in the barrel of the cyclone combustor continues having the first oxygen concentration; and means for combusting at least a portion of the fuel in the barrel of the cyclone combustor with at least a portion of the combined oxidant in the barrel of the cyclone combustor, thereby generating the flue gas containing a reduced amount of nitrogen oxide in the barrel of the cyclone combustor, said reduced amount of nitrogen oxide being less than a higher amount of nitrogen oxide that would be generated by the cyclone combustor operated with a flow of air as an only oxidant.

34. A system as in claim 33, wherein the throat end of the barrel of the cyclone combustor is in fluid communication with a furnace, further comprising:

means for transferring at least a portion of the flue gas from the barrel of the cyclone combustor to the furnace;

means for feeding a stream of a secondary fuel into the furnace; and means for combusting at least a portion of the secondary fuel in the furnace.

35. A system as in claim 33, wherein the first flowrate and the second flowrate result in a stoichiometric ratio less than about 1.0 in the barrel of the cyclone combustor.

36. A system for operating a steam-generating boiler or furnace in communication with a cyclone combustor having a burner in communication with a barrel having a longitudinal axis, a burner end adjacent the burner, and a throat end opposite the burner end, comprising:

means for feeding a stream of the fuel into the barrel of the cyclone combustor at the burner end of the cyclone combustor;

means for feeding at least one stream of a first oxidant having a first oxygen concentration of about 21 vol. % into the barrel of the cyclone combustor at a first flowrate, the at least one stream of the first oxidant comprising at least one predominant stream of the first oxidant;

means for feeding at least one stream of a second oxidant having a second oxygen concentration greater than the first oxygen concentration into the barrel of the cyclone combustor at a second flowrate and in a selective manner, whereby a portion of the first oxidant in the barrel of the cyclone combustor combines with at least a portion of the second oxidant in the barrel of the cyclone combustor, thereby forming a combined oxidant having a combined oxygen concentration greater than the first oxygen concentration and less than the second oxygen concentration, and at least a portion of the first oxidant from the at least one predominant stream of the first oxidant in the barrel of the cyclone combustor continues having the first oxygen concentration;

means for combusting at least a portion of the fuel in the barrel of the cyclone combustor with at least a portion of the combined oxidant in the barrel of the cyclone combustor, thereby generating an amount of thermal energy in the barrel of the cyclone combustor; and means for transferring at least a portion of the amount of thermal energy from the barrel of the cyclone combustor to the steam-generating boiler or furnace.

* * * * *